Jan. 10, 1933.　　　　M. ROMERA　　　　1,893,871
AGRICULTURAL MACHINE
Filed June 14, 1930　　3 Sheets-Sheet 1

INVENTOR.
Manuel Romera
BY
Francis H. Davis.
ATTORNEY.

Jan. 10, 1933. M. ROMERA 1,893,871
AGRICULTURAL MACHINE
Filed June 14, 1930 3 Sheets-Sheet 2

INVENTOR.
Manuel Romera
BY Francis H. Davis
ATTORNEY.

Jan. 10, 1933. M. ROMERA 1,893,871
AGRICULTURAL MACHINE
Filed June 14, 1930 3 Sheets-Sheet 3
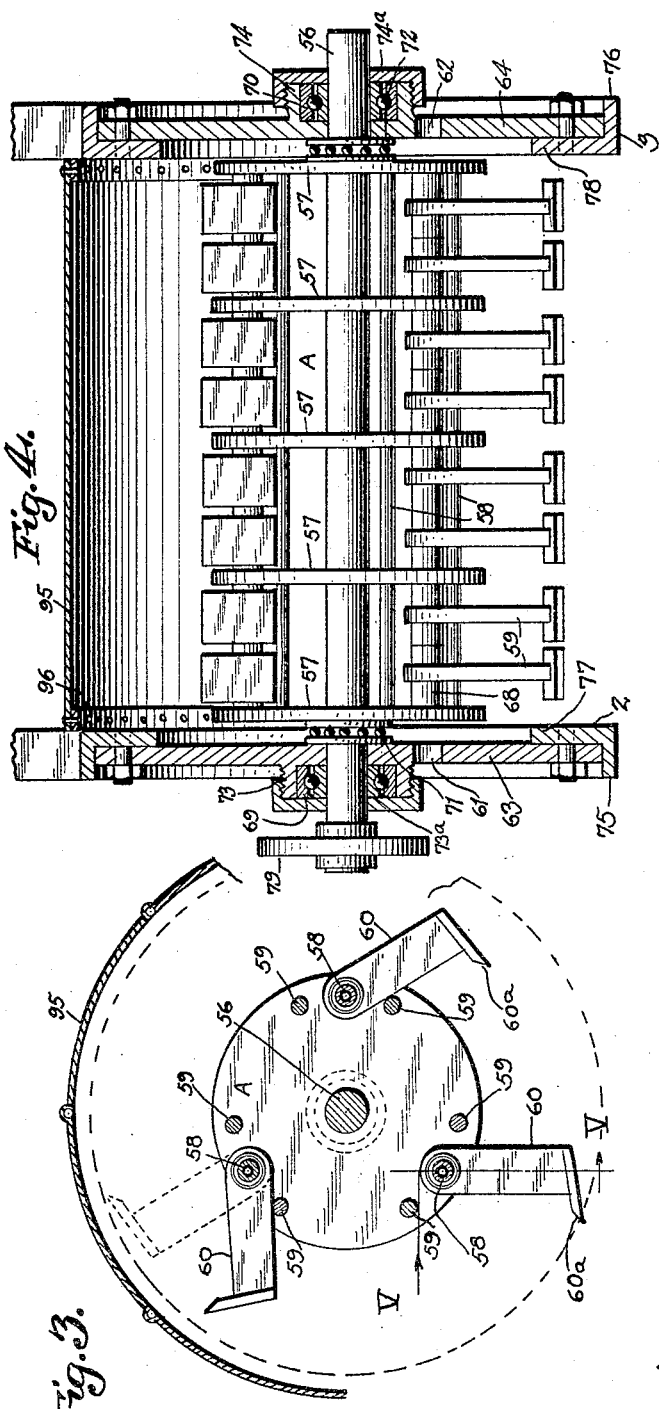
INVENTOR.
Manuel Romera
BY Francis H. Davis,
ATTORNEY.

Patented Jan. 10, 1933

1,893,871

UNITED STATES PATENT OFFICE

MANUEL ROMERA, OF CASTROVILLE, CALIFORNIA, ASSIGNOR, BY MESNE ASSIGNMENTS, OF TWO-THIRDS TO A. PAVAN, OF SAN FRANCISCO, CALIFORNIA

AGRICULTURAL MACHINE

Application filed June 14, 1930. Serial No. 461,175.

The present invention relates to agricultural implements, and consists in the construction, combination and arrangement of parts hereinafter described, illustrated and claimed.

Briefly stated, the general object is to provide an implement which when traversed along the rows of certain crops under either its own power or that of an independent agent, such as a tractor, will synchronously perform several necessary, useful and labor-saving operations.

My implement, hereinafter called "the machine" as illustrated, is adapted for use in the artichoke fields, which, in California alone, comprise many thousands of acres, although it is believed that the machine is equally applicable for use in the culture of other crops such as pine-apples, sugarcane and other perennials which may be benefitted by pruning close to the ground to remove old growths and weeds and allow a new growth to spring up from the old stools; or, by a different setting of the machine cause it to cut deep enough to exterminate the plants entirely in order to prepare the land for a replanting.

It should be observed that the crops above-mentioned are coarse feeders drawing heavily on the land and it is very desirable to return as much of this growth as possible to the soil instead of destroying it by burning which is the usual custom.

An important object, therefore, is to provide a transverse rotary cutting element provided with a plurality of pivoted cutting members adapted to fly out radially by centrifugal force and thus chop all vegetal matter encountered into fine pieces which serve as a mulch and eventually decompose to enrich the soil.

A further object is to disc the ground at each side of the row of plants throwing the soil outwardly thereby leaving irrigation furrows open for water to flow in confined channels adjacent the plants.

Another object is to provide adjustable means to gauge the travel of the machine at various levels relative to the ground plane and independent means to raise and lower the disc elements.

An additional object is to provide certain novel closure bearings to journal the main shaft of said rotary element.

Another object is to provide hardened removable bushings for the pivotal members and lubricative means therefor through hollow pivot shafts.

Further objects are to provide an independent drive for said element carried by the machine, and to provide a universal attachment adapted to couple the machine to a tractive agent; and further objects that will hereinafter appear, be particularly pointed out in the claim and illustrated in the accompanying drawings wherein similar reference indicia refer to similar parts throughout the several views in which:—

Figure 2 shows a top plan view.

Figure 3 is a fragmentary cross-sectional view of the rotary element on a larger scale.

Figure 4 shows a sectional view of the rotary element taken on the line IV—IV of Figure 1, and to a larger scale.

Figure 5 shows an enlarged sectional view of the pivotal elements of the cutting member taken on the line V—V of Figure 3.

Figure 1:
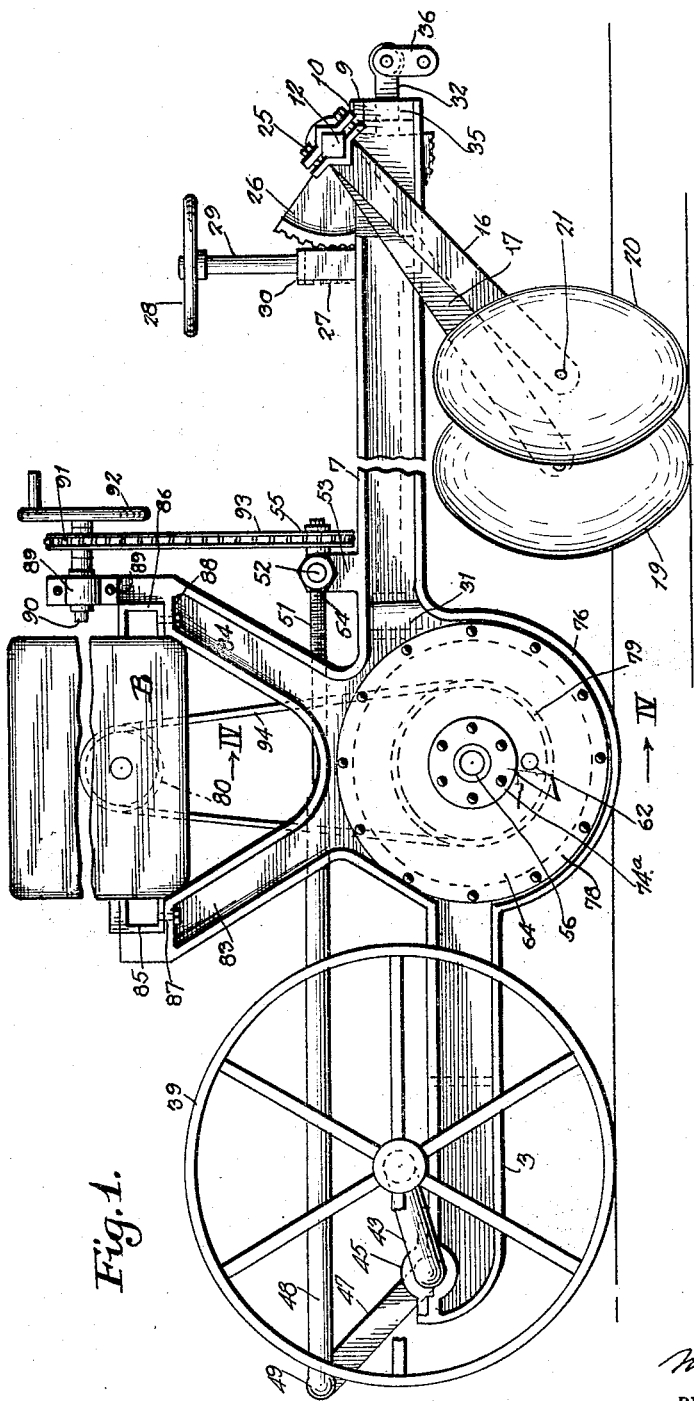
Figure 1 shows a side elevation of the machine of my invention.

In carrying out my invention I provide a longitudinal frame comprising the left side member 2 and the right side member 3 which are both extended inwardly at the points 4 and 5 to form the front side frame members 6 and 7 all well shown in Figure 2. Said frames may well be of steel castings or otherwise built up by welding structural forms together to produce the desired shape. As shown in the drawings, said frames are of channel construction having the smooth sides facing each other.

Figure 6:
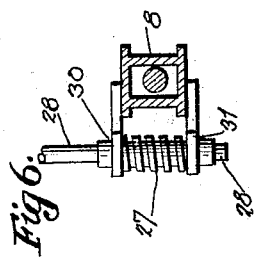
Figure 6 is an enlarged detailed view of the worm bracket, taken about the line VI—VI of Figure 2.
Figure 6:
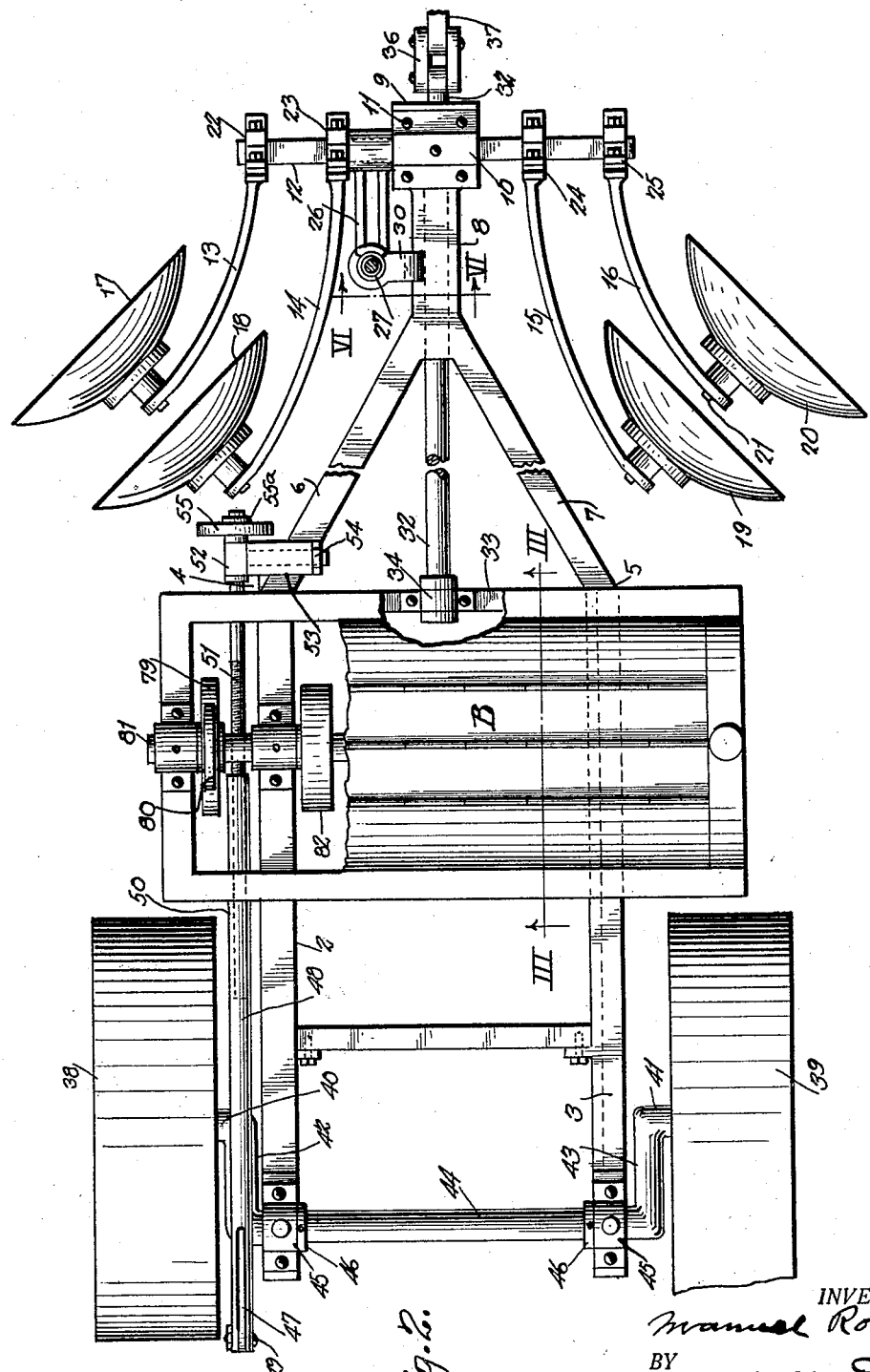

In Figure 2 it will also be noted that the members 6 and 7 merge into the neck 8 whose cross-section is well shown in Figure 6 and provided forwardly with the base 9 which supports the journal block 10 attached thereto by the bolts 11, and that the transverse shaft 12 is mounted in said journal. The shaft is preferably of square cross-section turned down round to allow relative revoluble movement in said journal and extends for sufficient distance in both directions to support the arms 13, 14, 15 and 16 which respectively carry the plow-discs 17, 18, and 19 and 20, said discs being each revolubly-mounted on axes as 21 and adapted to throw the earth outwardly from the axis of travel of the machine. The arms are secured to said shaft by the clamps 22, 23, 24 and 25.

Up and down movement to regulate the depth of cut of said discs and to attain sufficient clearance above the ground surface when turning headlands, etc., is attained by means of the worm gear segment 26 fast to the shaft 12 and acted upon by the worm 27 manually operable by the hand wheel 28 fast to the shaft 29 suitably mounted in the brackets 30 and 31, said worm being fast to the shaft 29.

As shown in Figure 2 the draw-bar 32 extends forward axially from the transverse frame member 33 to a point suitably beyond the front end of the machine, said bar being journaled for swivelable movement in the boxes 34 and 35 (the latter indicated in dotted lines in Fig. 1). Said bar is provided at the forward end with the coupling link 36 (see Figure 2) adapted for connection with the draw-rod 37 of a tractive motor, said motor constituting the front support of the machine when in operation; the back being supported by the respective ground engaging wheels 38 and 39 mounted respectively on the axles 40 and 41 extending laterally from the respective cranks 42 and 43 fast to the main axle 44 which is journaled in the bearings 45—45 secured to the members 2 and 3 and provided with the collars 46—46 to prevent end play of said axle.

The arm 47 extends upwardly and outwardly from the crank 42 to make linked connection with the member 48 at point 49. Said member 48 is preferably a piece of extra strong pipe of sufficient length, and internally threaded as indicated by dotted lines 50 to accommodate the screw 51 which in turn is externally screw-threaded for interengagement with said internal thread.

The forward end of said screw is unthreaded and passes through the pivotal cross-head 52 whose shank is journaled in the bearing 53 carried by the frame member 6, and held in turnable relation to said bearing by the nut 54, the sprocket 55 preventing axial displacement of said screw with relation to said cross-head in one direction and the collar 55a, in the other. Obviously, when thus mounted, with said sprocket fast to the screw, rotation of said sprocket in either direction raises or lowers the rear end of the machine by rotation of said main axle in the bearings 45.

Intermediate said plow discs and the wheels 38 and 39 is the rotary cutting element A which according to Figures 3 and 4 comprises the axle shaft 56, the plurality of spacing discs 57 fast to said axis, the plurality of pivot-shafts 58 disposed longitudinally of the element and carried in alined openings drilled at equi-distant radial intervals suitably adjacent the perimeter of said discs. Rest-bars 59 are mounted in said discs parallel with said pivot shafts, one such bar disposed at each side of each pivot-shaft for a purpose that will appear while a plurality of centrifugally movable cutting members 60 are pivoted on said pivot-shafts, the centers of all said shafts and bars being concentric with said axle shaft 56 so that said shafts and bars may be inserted or removed through the openings 61 and 62 in the respective closure-heads 63 and 64 when effecting replacements. The pivot shafts 58 are of thick walled tubing and are provided with transverse perforations 65 adapted to carry lubricating matter to the contacting surfaces of the replaceable bushings 67 which line said pivotal bearings 68. All of said pivotal parts are preferably hardened and ground.

The axle shaft 56 of the element A being adapted to run at high speed under dusty gritty conditions, is equipped with dustproof anti-friction bearings 69 and 70 adapted respectively to minimize radial and end thrusts imparted by said element.

The closure heads 63 and 64 are substantially smooth on their inner surfaces, provided with the counter-bored hubs 73 and 74 which are adapted to house the bearings 69 and 70 respectively, said hubs being suitably threaded for interengagement with the respective caps 73a and 74a.

In Figures 1 and 4 it will be seen that said closure heads 63 and 64 are adapted respectively to fit within the rims 75 and 76 and to bolt fast against the contacting flanges 77 and 78, a construction which permits the insertion or removal of the element A from the machine without disassembling the side frames.

The sprocket 79 is keyed to the axle shaft 56 and is adapted to be driven by the sprocket 80 fast to the drive-shaft 81 of the diagrammatically shown engine B provided with the clutch 82 adapted to pick up and release the load and assumed to be provided with the other necessary members of a conventional engine unnecessary to show. Said engine is carried by four Y-members two of which appear as 83 and 84 uprising at an oblique angle from the frame member 3, it being understood that the companion Y-members rise from the frame 2.

Said Y-members have seats adapted to hold the bed-frames 85 and 86 of said engine secured thereto by bolts as 87 and 88. The bearing 89 attached to an upper frame member, journals the shaft 90, the outer portion of which carries the sprocket 91 and the hand wheel 92, both being fast to said shaft; said sprocket is provided with the chain 93 adapted to drive the sprocket 55 for rotation of the screw 51.

In order that my invention may be clearly understood it should be noted that as shown in Figure 2 the links 36 are assumed to be attached to a tractive agent by means of the draw-rod 37. Note that in Figure 1 the hand-wheel 92 has been manipulated so as to cause the sprocket 91 to act on the sprocket 55 by means of the chain 93 so as to rotate the screw 51 in a direction adapted to extend the member 48 rearwardly, thus traversing the arm 47 counter-clockwise, for the elevating cranks 42 and 43 thereby lowering the rear end of the machine until the element A is at the proper level to cut the plants off at the desired height with respect to the ground level when the members 60 revolving rapidly and extended radially under centrifugal force.

Note further, that by proper manipulation of the hand-wheel 28 the worm 27 has acted on the segment 26 so as to depress the respective arms 13, 14, 15 and 16 thereby lowering the respective discs 17, 18, 19 and 20 to the proper plowing level.

Now, assuming that an operator stationed between the two said hand-wheels starts the engine B in a clockwise direction; then, when the clutch 82 is engaged the sprocket 80 will drive the chain 94 engaged with the sprocket 79 so as to rotate the axle shaft 56 in the same direction thereby rotating the element A clockwise. In practice I find 800 or 1000 R. P. M. a suitable speed to cause the members 60 to fly out radially as indicated at C Figure 3, their arc being restricted by contact with the adjacent rest-bars.

As the machine traverses forward along the row the centrifugally-extended cutter members actuate downwardly against all plant growth encountered, whereby said plant stalks and branches are chopped and pulverized into minute pieces well calculated to form a mulch and readily decompose; incidentally, retaining moisture in the ground which aids the plants thus pruned to spring up and make a vigorous new growth.

It has been customary to cut down old artichoke growth with a stout weed-sythe by hand, an expensive and laborious process; furthermore, after the plants have been mowed down it has been necessary to open up furrows at each side of the row, for the triple purpose of stirring the ground, destroying weeds and forming grooves for water to follow when irrigating.

By means of my present invention the plants are pruned at the proper level and chopped as described, weeds are destroyed, and the necessary irrigation furrows opened up at an average speed of four miles an hour, all in one operation.

It should be explained that the operation of the machine raises a cloud of heavy dust hence the necessity for alemite lubrication, dust proof anti-friction bearings and the cover element 95 housing the element A by attachment to the arcuate flanges 96 well shown in Figure 4 as extending inwardly from the adjacent frame structure.

It should be further noted that by pruning vigorous plants at about the surface level with a clean, sharp cut they are in splendid condition to shoot a new growth, but if it is desired to eradicate a senile growth of plants to prepare for another crop a deeper setting of the machine in the manner above described will cause the element A to operate at a depth sufficiently low to do so.

Obviously, when turning headlands or when traveling the machine out of operation said plow-discs may be elevated by the means indicated and the rear end of the machine raised by clockwise movement of the cranks 42 and 43, in the manner described.

It is believed that my invention and the advantages to be gained by the use thereof are fully explained. In reducing the invention to practice, certain minor features in construction, combination and arrangement of parts may necessitate alteration, to which the patentee is entitled, providing such alteration is comprehended in the scope of what is claimed.

What I claim is:—

In a machine of the character described, side frame members, a rotary cutting element including a transverse axle shaft journalled on the frame members, spaced disks fixed to the axle shaft, hollow pivot shafts between the disks outwardly of and parallel with the axle shaft, a plurality of radially extending cutter members mounted for independent pivotal movements on the hollow pivot shafts for shearing and chopping plant growths said cutter members having relatively wide pivot bearing ends bushings lining the cutter member pivot bearings, and lateral oil ways perforating the walls of said pivot shafts adapted to lubricate the contacting pivotal surfaces of said bushings.

In testimony whereof I affix my signature this 31st day of May, 1930.

MANUEL ROMERA.